United States Patent
Pfnuer et al.

(10) Patent No.: US 7,354,203 B2
(45) Date of Patent: Apr. 8, 2008

(54) PACKAGES FOR DEVICES AND COMPONENTS

(75) Inventors: Stefan Pfnuer, Los Gatos, CA (US); Tengda Du, Fremont, CA (US); Kevin Zhang, San Jose, CA (US); Julie S. Eng, Los Altos, CA (US); Axel Mehnert, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 115 days.

(21) Appl. No.: 11/178,624

(22) Filed: Jul. 11, 2005

(65) Prior Publication Data

US 2006/0024004 A1 Feb. 2, 2006

Related U.S. Application Data

(60) Provisional application No. 60/592,707, filed on Jul. 30, 2004.

(51) Int. Cl.
*G02B 6/36* (2006.01)
(52) U.S. Cl. ........................................................ 385/92
(58) Field of Classification Search ...................... None
See application file for complete search history.

(56) References Cited

U.S. PATENT DOCUMENTS

| | | | | |
|---|---|---|---|---|
| 4,502,754 A | * | 3/1985 | Kawa | ........................ 385/134 |
| 5,515,469 A | * | 5/1996 | Zarem et al. | .................. 385/92 |
| 5,793,920 A | * | 8/1998 | Wilkins et al. | ............. 385/135 |
| 6,059,188 A | * | 5/2000 | diFazio et al. | ......... 235/462.36 |
| 6,084,697 A | * | 7/2000 | Lebby et al. | ................ 359/202 |
| 6,411,767 B1 | * | 6/2002 | Burrous et al. | ............. 385/135 |
| 6,464,409 B1 | * | 10/2002 | Ooe | ........................... 385/88 |
| 6,782,185 B2 | * | 8/2004 | Katayama et al. | ........... 385/140 |
| 2002/0136505 A1 | * | 9/2002 | Goldberg et al. | ............. 385/92 |
| 2005/0100290 A1 | * | 5/2005 | Huang | ......................... 385/92 |

\* cited by examiner

*Primary Examiner*—Sung Pak
*Assistant Examiner*—Mike Stahl
(74) *Attorney, Agent, or Firm*—Workman Nydegger

(57) ABSTRACT

A package for maintaining alignment of components includes a frame and a beam with the beam attached to the frame and one end of the beam. One or more components are mounted to the beam. The frame and a portion of the beam are separated from each other by a channel which allows portions of the beam to flex substantially independently of the frame when a force is applied to the frame. Thus, the effects resulting from forces applied to the frame are not experienced by the beam, or are at least attenuated, so that the alignment of the components mounted on the beam is substantially preserved.

14 Claims, 11 Drawing Sheets

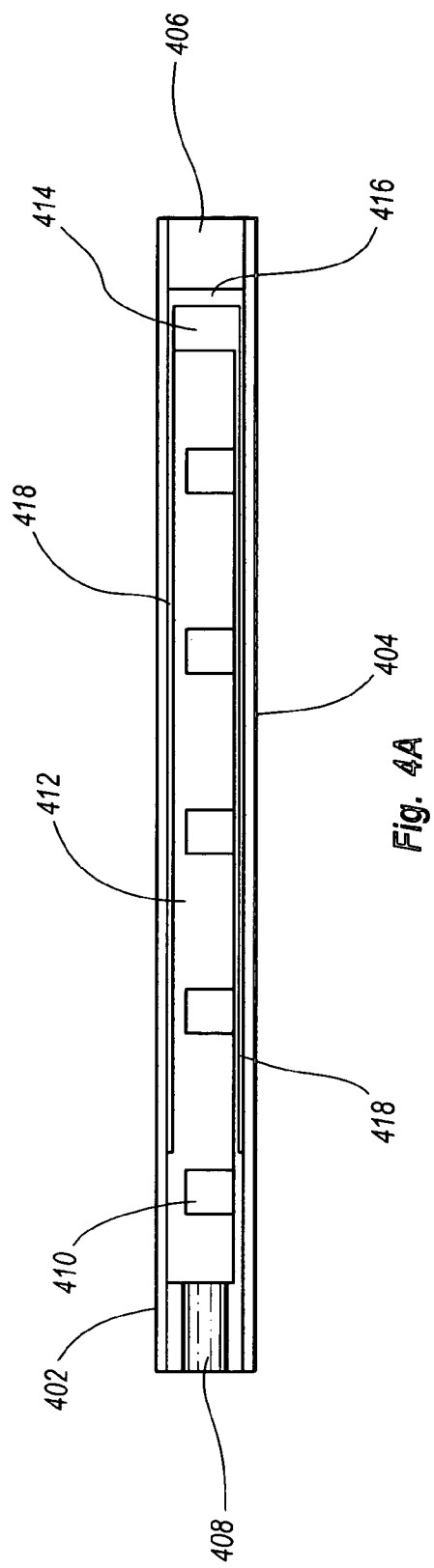
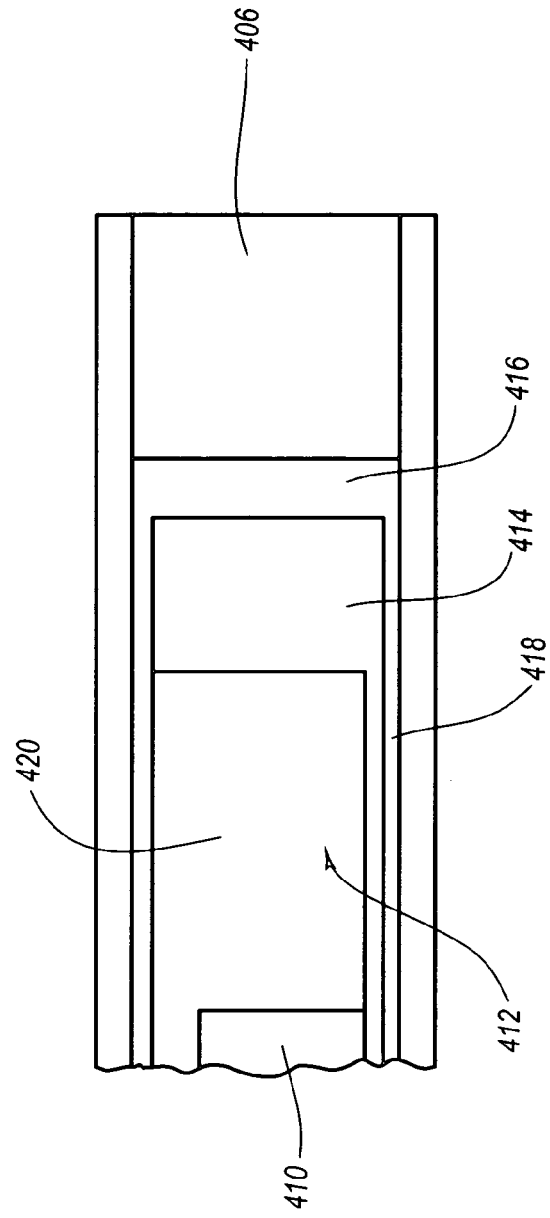
Fig. 4A
Fig. 4B

PACKAGES FOR DEVICES AND COMPONENTS

CROSS-REFERENCE TO RELATED APPLICATIONS

This application claims priority to U.S. Provisional Application Ser. No. 60/592,707 filed Jul. 30, 2004 entitled "Stress-Resistant Optical Component Package" which is hereby incorporated herein by reference in its entirety.

BACKGROUND OF THE INVENTION

1. The Field of the Invention

The present invention relates generally to packaging devices. More particularly, exemplary embodiments of the present invention concern packaging for optoelectronic components and devices, where such packaging isolates the components and devices from the effects of applied forces.

2. Related Technology

Fiber optic technology is frequently employed in computer and computer networking applications. Fiber optic lines or cables are often used to interconnect computers and computer networks. Generally speaking, computer networks configured using fiber optic cables offer improved bandwidth over conventional electronic networks. Therefore, development of technologies involving the use of fiber optic cables is increasing.

One area in which fiber optic technology is advancing relates to increasing the capacity of fiber optic networks while at the same time reducing cost. For example, wavelength division multiplexing (WDM) and dense wavelength division multiplexing (DWDM) technologies attempt to increase capacity and reduce cost by transmitting multiple optical signals through a single fiber wherein each signal is transmitted on a different optical wavelength or channel. Such a configuration requires that multiple optical signals be multiplexed for transmission and then demultiplexed to recover the individual signals, with the multiplexing and demultiplexing typically accomplished through the use of multiple thin-film optical filters.

The number of channels available for transmitting optical signals is a function of the channel spacing. Fiber optic capacity increases with more closely spaced channels. Channel spacing, however, is limited by the ability of the optical filters to resolve the channels. One way to minimize channel spacing is through the use of an interleaver, which combines two sets of channels into one densely packed set with half the channel spacing of the original sets, and a deinterleaver, which separates a plurality of optical channels into odd and even channels with a spacing twice as large as the spacing of the original channels. Therefore, use of an interleaver in combination with a multiplexer allows for much smaller channel spacing than does a multiplexer alone.

While useful, multiplexers and interleavers are generally configured using a large number of optical components. Such components may include beam splitters, half-wave plates, quarter-wave plates, reflectors, prisms, beam displacers, lenses, and the like. For an interleaver to function properly, each constituent component must be carefully aligned with respect to the other components. Such alignment is typically achieved by mounting each component to a planar reference structure, such as a stage, box, or frame.

Not only are the components of multiplexers or interleavers carefully aligned, the components are often placed inside a hermetically sealed package. By hermetically sealing the optical components in this way, contaminants, such as moisture, that would have a deleterious effect on the device, are kept away from the optical components.

A hermetically sealed package is typically made by seam sealing one or more lids onto a box or frame after the optical components have been placed in their proper positions. Common techniques for seam sealing include welding and gluing. Laser welding is particularly common for fiber-optic device packaging.

While hermetically sealing an optical device package is beneficial in protecting optical components, sealing a package without disturbing the alignment of the components within the package is difficult. The sealing process can generate a significant amount of heat, causing thermal distortion of parts, or can create mechanical stress from solidification contraction forces.

Problems involving protecting optical components while sealing an optical package have been addressed in the past by careful analysis and characterization of the sealing process, such that the shifts in alignment of the optical components are well-understood and replicable. The information concerning the shifts in alignment of the optical components is used to develop methods for compensating for the misalignment, such as assembling the optical components out of alignment and then bringing the optical components into alignment by the sealing process. In the case of laser welding, the predictability of the alignment shifts can be enhanced by careful selection of beam-delivery optics, weld schedule, and the use of simultaneous multiple welds. Still, the alignment accuracy offered by such techniques is not satisfactory for many applications. In addition, the effort needed to analyze the sealing process for a particular product can be both expensive and time-consuming.

Moreover, packaged optical devices are typically mounted onto another structure when used for their intended purpose. The packaged optical devices may be attached in various conventional ways, such as with screws or with epoxy. Mounting the package is another source of forces which can result in the creation of mechanical stress on the package that may disturb the alignment of the optical components in the package. Further, effects such as mechanical stress may arise because of forces that result from differing thermal characteristics, such as the coefficient of thermal expansion, of the materials of the package and the mounting structure. Thus, it is nearly impossible to characterize and compensate for all effects related to forces associated with the mounting of optical devices or other devices.

Therefore, what is needed is a package that is relatively insensitive to effects, such as mechanical and thermal stresses, that can result from the application of forces to the package, so that the components in the package substantially maintain their respective alignments even through the sealing process. Such a package would offer high performance and high reliability, but at a substantially lower cost.

BRIEF SUMMARY OF AN EXEMPLARY EMBODIMENT OF THE INVENTION

The foregoing and other problems relating to maintenance of alignment of package components are overcome by embodiments of the present invention which are generally directed to isolating package components from external forces on the package by attaching package components to a beam on the interior of the package. In one exemplary embodiment of the invention, the beam is attached to a frame of the package at one location on the beam. In addition, a channel separates the beam from the frame such that the beam and the frame are in contact with one another only at the location where the beam is attached to the frame. Therefore, when the package is subjected to an applied force or forces, the resultant stress, strain and/or torque is experienced by the frame while the beam and mounted components are largely unaffected. The beam is substantially isolated from the movements of the frame so that the components mounted on the beam are substantially isolated from effects that result from forces applied to the frame.

These and other aspects of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings are not drawn to scale. The invention will be described and explained with additional specificity and detail through the use of the accompanying drawings in which:

FIG. 4A is a side view of an exemplary package;

FIG. 4B is an expanded side view of an exemplary package;

DETAILED DESCRIPTION OF EXEMPLARY EMBODIMENTS OF THE INVENTION

Embodiments of the present invention concern systems and methods for packaging device components in a way that substantially isolates the device components from the resultant effects of forces that may be applied to the package. In one embodiment of the invention, the package comprises a beam rigidly attached to only one end of a frame. Components are mounted to the beam which is surrounded and protected by the frame. While the package may be sealed by attaching lids to the frame, the beam and components are not in mechanical contact with the lids. Thus, it is primarily the frame, and not the components, that is subjected to forces, torque or stresses that may be present during either the sealing process or when the package is mounted to the frame.

Figure 1:
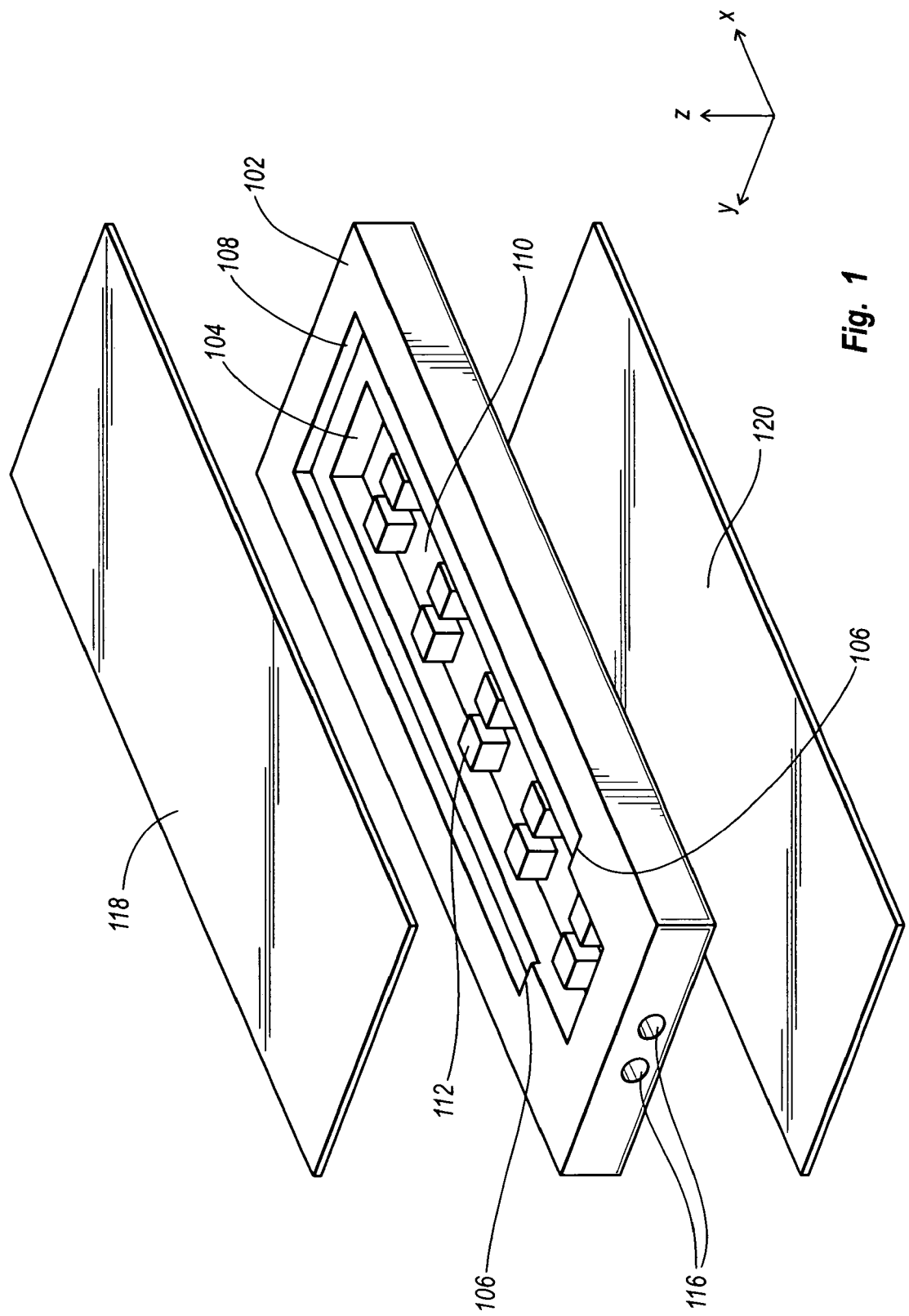
FIG. 1 is an exploded perspective view of an exemplary package.

With attention now to FIG. 1, an exploded perspective view of an exemplary package 100 is shown. Beam 104 is attached to frame 102 on one side of frame 102, at connection points 106, in a cantilever arrangement. An open space, or channel, 108 separates beam 104 from frame 102. In addition, beam 104 includes platform 110. The configuration of beam 104 and platform 110 in relation to frame 102 is shown in more detail with reference to FIG. 3A below.

Components 112 are mounted to platform 110 within package 100. In one embodiment of the invention, components 112 are optical components. However, in other embodiments of the invention, components 112 may be electrical or other components. While optical components 112 are shown in FIG. 1 mounted to platform 110, in other embodiments of the invention, optical components 112 may be mounted to beam 104 in any number of different configurations. Additionally, other components may be mounted to frame 102.

The package 100 includes optical ports 116, through which optical signals pass from outside the package 100 to optical components 110 inside the package, and vice-versa. In one embodiment of the invention, optical connectors (not shown) are mounted to optical ports 116 of package 100. Finally, lids 118 and 120 attach to frame 102 to protect optical components 110. In one embodiment of the invention lids, 118 and 120 cooperate with frame 102 to provide a hermetic enclosure to protect optical components 110 from harmful moisture. Lids 118 and 120 are configured with respect to beam 104 such that there is a clearance (shown in detail below in FIGS. 4A and 4B) between lids 118 and 120 and beam 104.

Optical ports 116 and optical components 110 shown in FIG. 1 are illustrative only. The number, type, shape, and placements of optical components and optical ports used in a package is determined by the particular application. For example, isolators, circulators, amplifiers, multiplexers, and interleavers will each be realized by a different assembly of components and may need a particular number of optical ports. Further, optical ports 116 may be used to pass multiple signals. For example, a single port may be used for incoming and outgoing signals.

While signals are received into package 100 through optical ports 116, package 100 preserves the alignment of components 112 so that the signal can be transmitted through components 112. When a force is applied to package 100, resulting stress, strain or torque may cause the frame 102 to experience movement or flexing. At least some portions of the beam 104, however, are isolated from movement of frame 102 by channel 108. The cantilever arrangement of beam 104 allows at least a portion of beam 104 and frame 102 to move substantially independently of each other. Further, the size and geometry of channel 108 serves to accommodate changes in the position of frame 102 relative to beam 104. Thus, when frame 102 is subjected to a force, beam 104, including optical components 112 mounted on platform 110, is substantially isolated from effects resulting from the force applied to frame 102. Therefore, the alignment of optical components 112 is substantially unaffected by the force(s) applied to package 100. By attaching to frame 102 only at connection points 106, and by virtue of the separation from frame 102 by channel 108, beam 104 remains sufficiently flexible and isolated from movements or flexing of frame 102 such that optical components 112 are largely unaffected by any movement or flexing of frame 102. Thus, the alignment of optical components 112 is substantially maintained despite the application of forces to the frame 102. The configuration of beam 104 and frame 102 such that beam 104 is substantially isolated from movement of frame 102 is shown in more detail in FIG. 3B, discussed below.

With respect to the embodiments disclosed herein, it should be noted that the application of a force, or forces, to exemplary packages may occur as the result of various conditions. In some exemplary cases, the application of forces results from thermal effects while in other cases, such forces are applied by structures in contact with, or connected to in some way, the package. It should further be noted that the application of a force or forces to the package can result in various effects which include, but are not limited to, stress, strain, torque, and combinations of these. Such stresses and strains may, moreover, be compressive, tensile, or may comprise both compressive and tensile elements. Accordingly, embodiments of the invention should not be construed to be limited to use or operation in any particular environment or in connection with any particular set of circumstances.

The cantilever arrangement of beam 104, wherein beam 104 is attached to frame 102 at connection points 106 with beam 104 arranged so that in some instances no other portion of beam 104 contacts frame 102, is one exemplary structural implementation of a means for substantially isolating the optical components 112 mounted on beam 104 from effects resulting from the application of forces to the frame 102. Thus, such means serve, among other things, to mitigate, if not eliminate, the effects to the mounted components that would otherwise result from the application of a force, or forces, to the package. Of course, other structures of comparable functionality can alternatively be employed as well, such as, for example, a multiple beam configuration.

Figure 2:
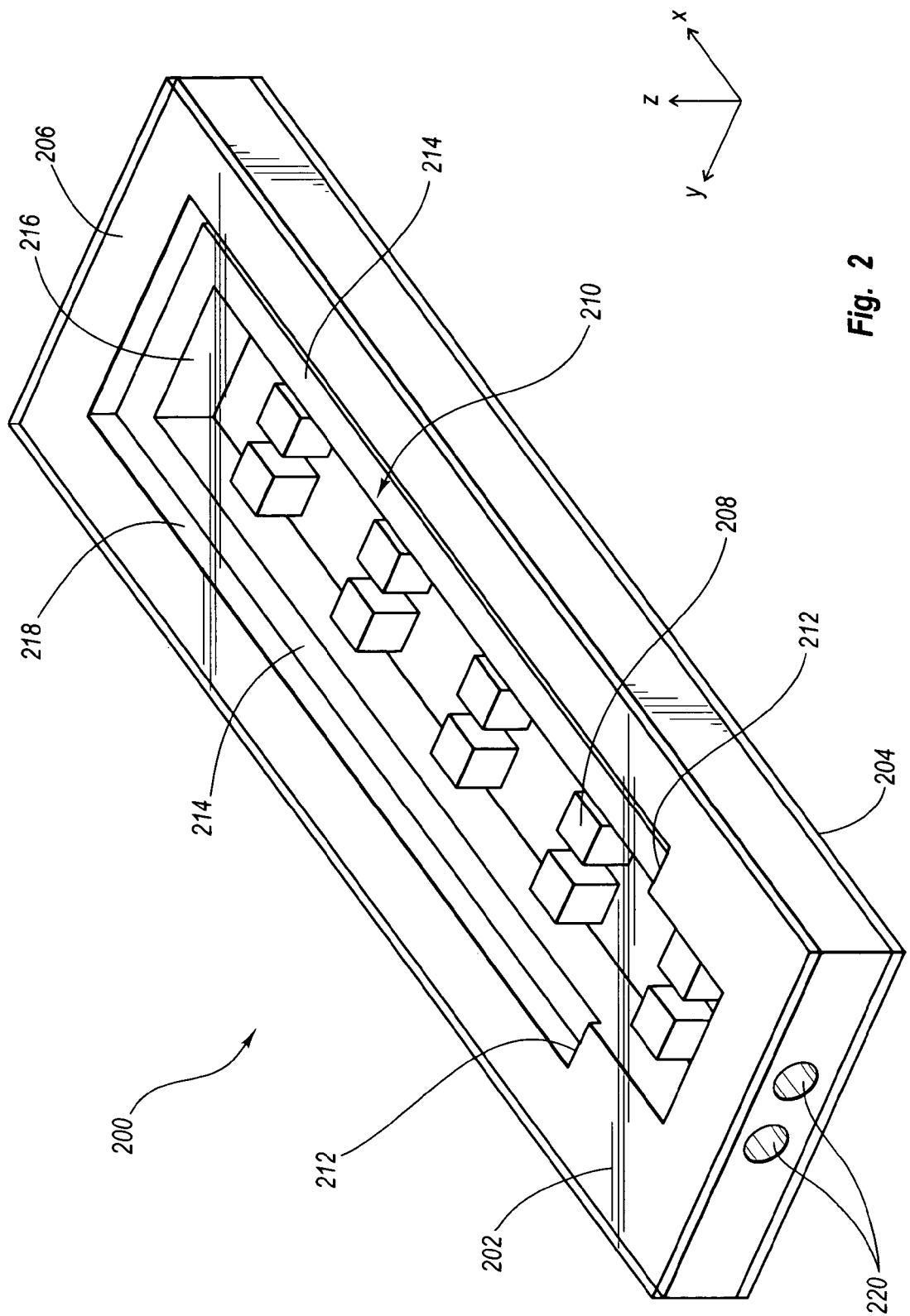
FIG. 2 is a perspective view of an exemplary package.

With attention now to FIG. 2, a perspective view of exemplary package 200 is shown, similar to the view of exemplary package 100 shown in FIG. 1. FIG. 2 shows lids 202 and 204 attached to frame 206. Top lid 202 is shown as transparent in order to show optical components 208 located on the interior of package 200. In one embodiment of the invention, lids 202 and 204 are opaque and are composed of the same material as frame 206, such as, for example, metal, plastic, glass, ceramic, or other materials.

Beam 210, attached to frame 206 at connection points 212, includes side walls 214 and end wall 216. Side walls 214 and end wall 216 are separated from frame 206 by channel 218. Beam 210 is shaped so that neither beam 210 nor optical components 208 mounted thereon contact either of lids 202 or 204 when lids 202 and 204 are attached to frame 206. Optical ports 220 connect components located on the exterior of package 200 (not shown) to optical components 208. In order to ensure that neither beam 210 nor optical components 208 contact either of lids 202 or 204, some embodiments of the invention provide for a beam 210 height that is less than the height of frame 206.

The configuration of beam 210 within frame 206 ensures that despite the application of forces to package 200, the alignment of optical components 208 is substantially unaffected. When a force is applied to package 200, at least a portion of the beam 210 is substantially isolated from effects of the force by channel 218. The size and geometry of channel 218 accommodates changes in the position of frame 206 relative to beam 210. In addition, beam 210 is able to flex substantially with any force transferred to beam 210 from the one side of beam 210 which is attached to frame 206. Further, channel 218 accommodates the movement of frame 206 relative to beam 210 for a range of applied forces such that side walls 214 and end wall 216 of beam 210 do not contact frame 206. The alignment of optical components 208 located on beam 210 is thus substantially, if not completely, preserved despite forces applied to frame 206. The configuration of frame 206, beam 210, channel 218, side walls 214, and end walls 216 which allows frame 206 and beam 210 to move substantially independently of each other is shown in further detail with reference to FIG. 4B below.

Figure 3A:
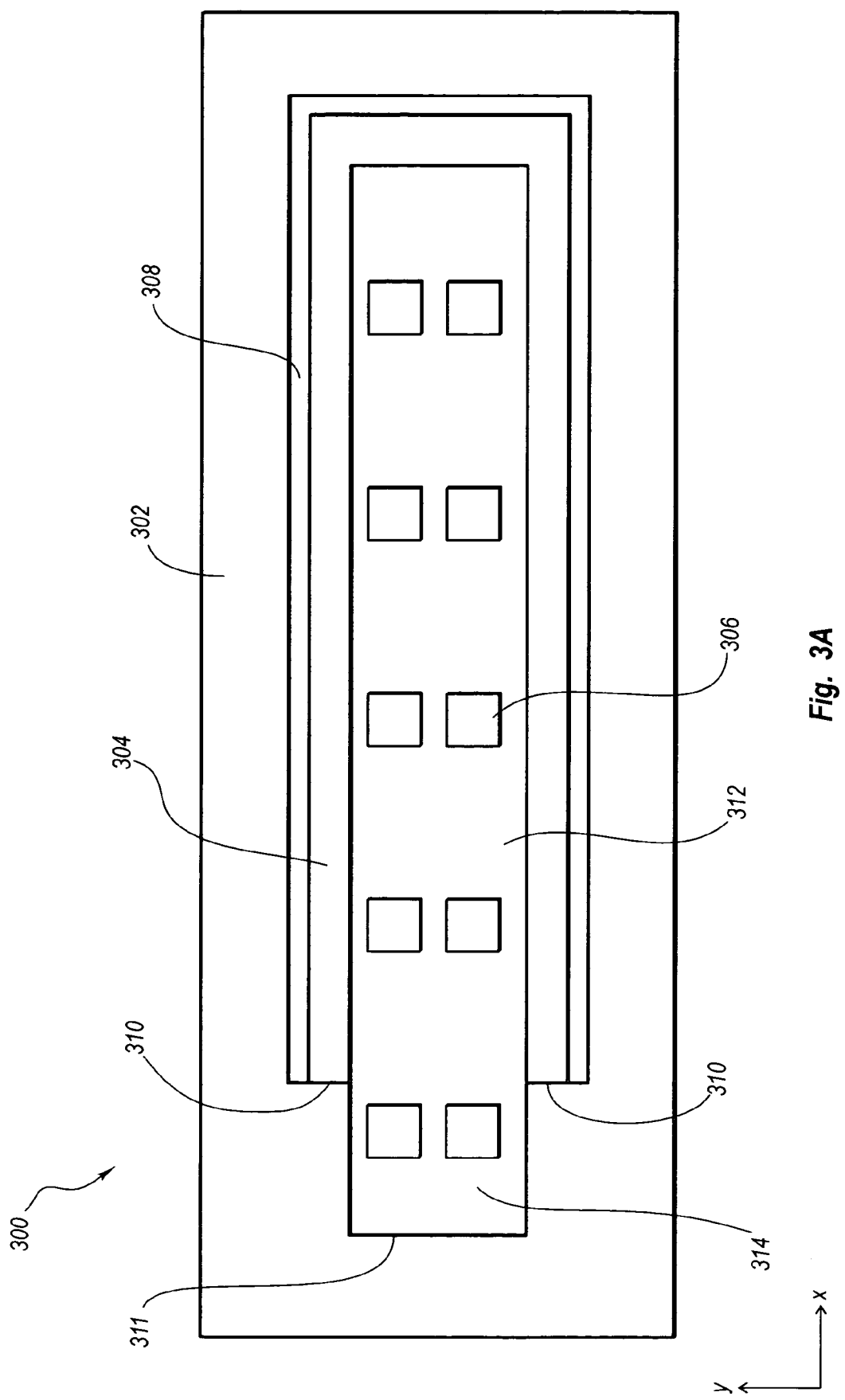
FIG. 3A is a top view of an exemplary package.

FIG. 3A, a top view of a package 300, shows the configuration of the frame 302, beam 304, and optical components 306 in more detail. Channel 308 is located between frame 302 and beam 304. As shown in FIG. 3, only one end of beam 304 is attached to frame 302 at connection points 310, thus allowing frame 302 and the free end of beam 304 to move substantially independently of one another. Beam 304 includes a platform 312 having an end 314 attached to frame 302 at connection point 311.

Frame 302 and beam 304 may be formed in any suitable manner. In one embodiment of the invention, the frame and beam are integrally formed of the same materials, such as for example, metal, glass, ceramic, or polymer materials. The frame and beam structure may be manufactured as a single piece of material having a channel between the frame and beam, using techniques such as die-casting or injection molding. The frame and beam structure may also be manufactured from a single piece of material, with the channel formed by cutting the channel between the beam and the frame. The channel may be cut using a wire saw, or it may be milled. The single piece may be die-cast, injection molded, or milled to have the proper shape before creation of the channel. Alternatively, the frame and beam could be made of two or more parts, of like or dissimilar materials, and assembled to form the structure.

In operation, a force applied to frame 302 may have little or no effect on beam 304. Because the beam 304 only contacts frame 302 at connection points 310 and 311, and due to the separation from frame 302 provided by channel 308, beam 304 is substantially isolated from the effects of forces experienced by frame 302. Channel 308 enables frame 302 and beam 304 to move substantially independently of each other, so that the effects of forces experienced by frame 302 are not transmitted to beam 304. Thus, the alignment of optical components 306 located on beam 304 remains substantially unaffected regardless of forces applied to the frame 302.

Figure 3B:
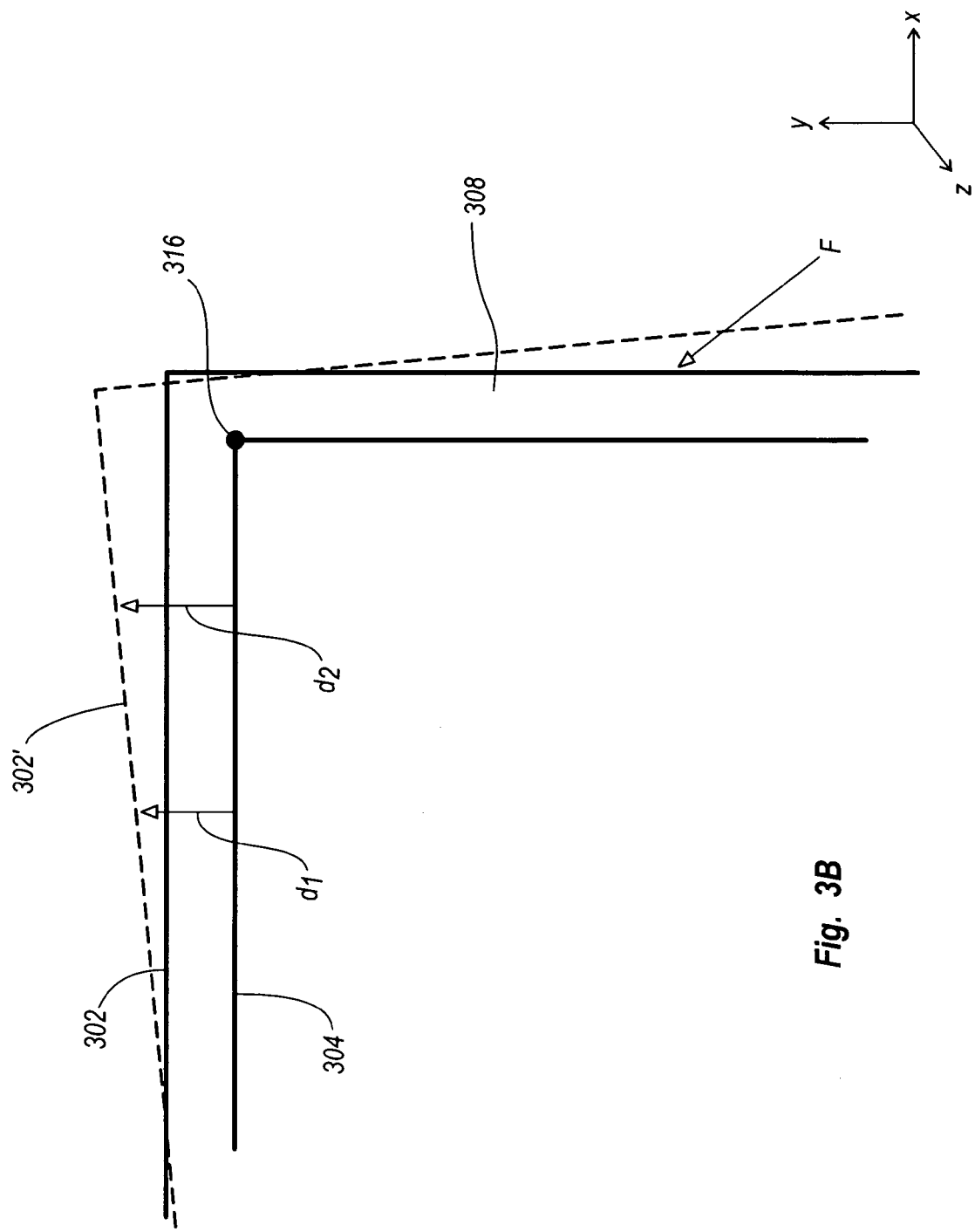
FIG. 3B is a schematic illustrating relative motion of a frame and platform.

More particularly, frame 302 and beam 304 are configured to preserve the alignment of optical components 306 by allowing independent movement of each of frame 302 and beam 304, as shown in FIG. 3B. FIG. 3B shows frame 302 and beam 304 separated by channel 308. In the exemplary embodiment shown in FIG. 3B, when frame 302 is not experiencing a force, frame 302 is positioned a distance $d_1$ from beam 304. When a force F is applied to frame 302, the position of frame 302 is altered, as shown by line 302'. In the position shown by line 302', frame 302 is now a distance $d_2$ from beam 304, where distance $d_2$ is greater than distance $d_1$. While frame 302 moves when a force is applied to frame 302, beam 304 remains substantially isolated from the movement of frame 302, as shown by reference point 316 of beam 304. When a force is applied to frame 302, application of the force causes frame 302 to shift to the position shown by line 302' but the position of reference point 316 of beam 304 remains substantially constant. Thus, the alignment of optical components 306 located on beam 304 is substantially preserved despite movement of frame 302 caused by forces experienced by frame 302.

While the movement of frame 302, in response to forces applied to frame 302, is shown in FIG. 3B to substantially occur in the x-y plane, it is to be appreciated that movement of frame 302 in additional planes of reference is also possible. For example, frame 302 may experience forces that cause frame 302 to move in the x-z plane or the y-z plane. Correspondingly, forces applied to the package 300 may have components residing in a variety of different planes. Regardless of the reference plane, or planes, in which the movement of frame 302 occurs, frame 302 does not contact beam 304 and the position of reference point 316 remains substantially constant. Therefore, the alignment of the optical components positioned on beam 304 is largely preserved regardless of the forces experienced by frame 302.

Turning now to FIG. 4A, a side view of a package 400 is shown. Lids 402 and 404 are attached to frame 406. Optical ports 408 are positioned on one end of package 400 to allow optical components 410, mounted to beam 412, to communicate with components located outside of package 400. End wall 414 of beam 412 is separated from frame 406 by channel 416. As shown in FIG. 4A, beam 412 is configured such that it has sufficient clearance 418 not to contact any interior portion of package 400, including lids 402 and 404, other than on one side of beam 412 where beam 412 is attached to frame 406 (as shown in FIG. 3).

The configuration of frame 406, beam 412, and channel 416 is shown in more detail in FIG. 4B. Optical components 410 are mounted to beam 412 while channel 416 separates end wall 414 of beam 412 from frame 406. As shown in FIG. 4B, beam 412 is configured such that there is a clearance 418 between the beam 412 and the lids 402 and 404 of package 400. In addition, channel 416 provides clearance between beam 412 and frame 406 of package 400. While end wall 414 of beam 412 is present in the exemplary embodiment shown in FIGS. 4A and 4B, end wall 414 is optional. Similarly, side walls 420 of beam 412 shown in FIG. 4B are provided in one exemplary embodiment of the invention. In other embodiments of the invention, side walls 420 may traverse only a portion of the length of beam 412 or side walls 420 may not be present at all. The presence or lack thereof of side walls 420 depends on the intended application of package 400. Different applications of package 400 may require differences in rigidity of beam 412, or for a specific moment of inertia for beam 412. Factors such as the rigidity of beam 412 and the moment of inertia of beam 412 may be controlled by the size and shape of beam 412 and the material of which beam 412 is composed.

In operation, the configuration of package 400 is such that at least a portion of beam 412 is substantially isolated from the effects of forces applied to package 400. Due to the configuration of package 400, a force applied to the package is experienced by frame 406. The cantilever arrangement of beam 412 with respect to frame 406, and the separation of end wall 414 from frame 406 by channel 416, allows frame 406 to move substantially independently of beam 412. In addition, the clearance between side walls 420 and lids 402 and 404 isolates beam 412 from forces experienced by frame 406. Thus, the alignment of optical components 410 relative to each other is substantially maintained regardless of forces applied to or experienced by frame 406 of package 400.

When the package 400 is designed, consideration is given to the environment in which the package 400 will be employed. In many applications, the shape of the beam 412 and channel 416 is chosen so that the resonant vibrational frequencies of the beam 412 do not correspond too closely to any source of vibration expected in the environment.

In some embodiments of the invention other design considerations outweigh consideration of the resonant vibrational frequencies of the beam 412. For example, when consideration of the preferred number and placement of optical components 410 on the beam 412 is more important than consideration of the resonant vibrational frequencies of beam 412, the response of the beam 412 can be damped. Damping may be achieved by using a damping material to connect the beam 412 and the frame 406 at one or more selected locations. For example, drops of adhesive can be placed in the channel 416 at one or more spots, so as to connect the beam 412 to the frame 406. The adhesive may be placed at the corners where the end wall 414 and side walls 420 of beam 412 intersect, or, alternatively, the adhesive may fill channel 416 entirely. A package 400 including the use of adhesive or other damping material thus possesses a degree of resistance to undesirable vibrations while also permitting the frame 406 some ability to move independently of the beam 402. As with the shape of beam 412, the type, amount, and placement of the adhesive in the package 400 is designed with the intended working environment of the package 400 in mind. Any other suitable damping material can be used, such as, for example, a silicone elastomer glue.

Figure 5A:
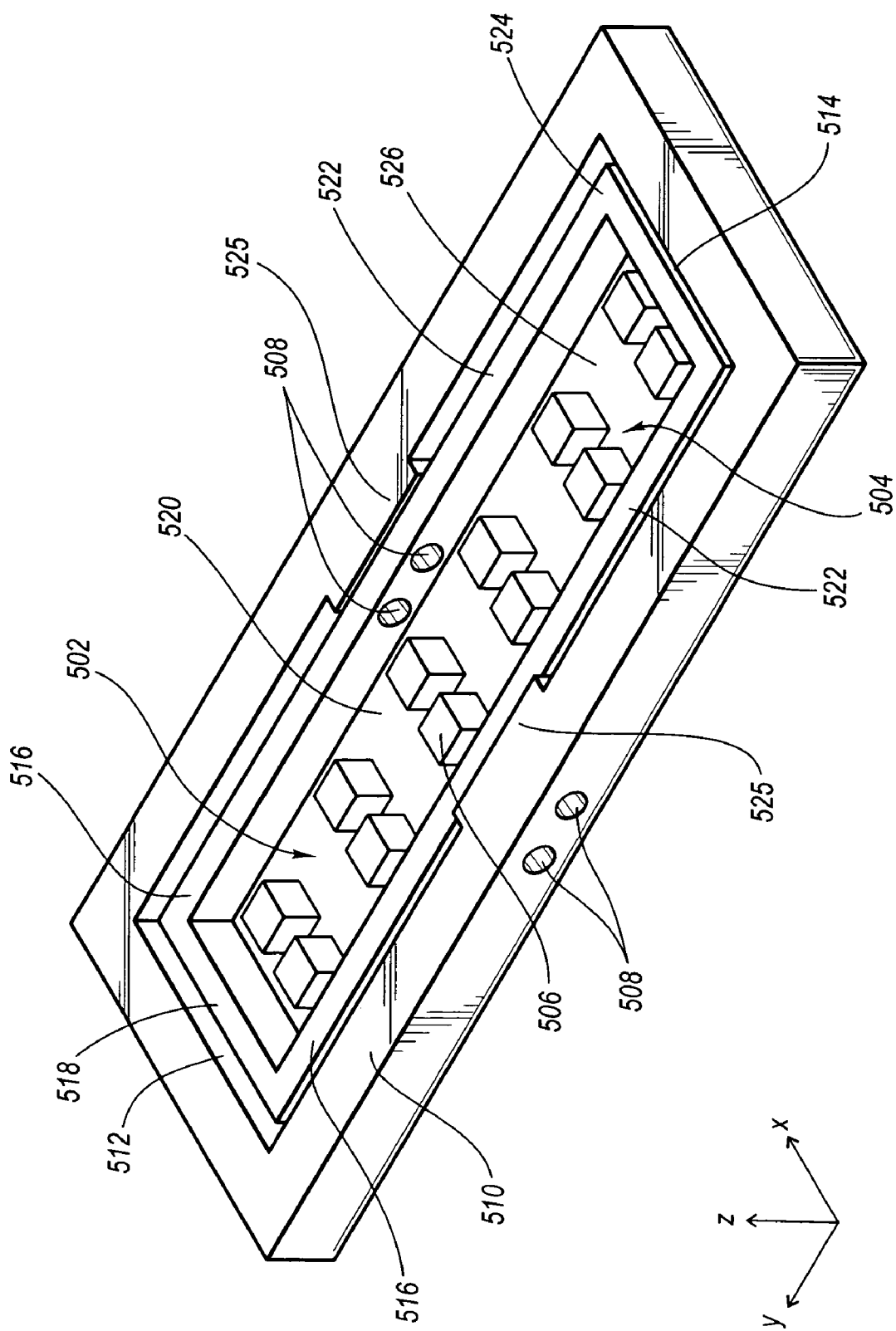
FIG. 5A is a perspective view of an exemplary package.

While embodiments of the invention outlined above include packages having one beam, other embodiments of the invention are directed to a package that may include one or more beams or other structure(s) of comparable functionality. In an exemplary embodiment of the invention, shown in FIG. 5A, a package 500 includes two beams, 502 and 504, with optical components 506 mounted on beams 502 and 504. Optical components 506 communicate with components located outside of package 500 (not shown) through optical ports 508.

With continued attention to beams 502 and 504, beams 502 and 504 attach to each other and to frame 510 at the center of package 500. In addition, channels 512 and 514 separate beams 502 and 504 respectively from frame 510. Beam 502 includes side walls 516, end wall 518, and platform 520. Similarly, beam 504 includes side walls 522, end wall 524, and platform 526. Together, beams 502 and 504 and respective platforms 520 and 526 serve as a mounting platform for optical components 506. Further, beams 502 and 504 may be attached to, or integrated with, each other.

Each of beams 502 and 504 is rigidly attached at connection points 525 to frame 510. To ensure that beams 502 and 504 and optical components 506 do not contact the lids (not shown) of package 500, some embodiments of the invention provide for a beam 502 and beam 504 height that is less than the height of frame 510.

As noted above, configuring beams 502 and 504 in this way ensures that optical components 506 are substantially isolated from the effects resulting from application of forces to the frame 510. In particular, the attachment of beams 502 and 504 to frame 510 at connection points 525 allows frame 510 to move substantially independently of beams 502 and 504. Thus, beams 502 and 504 are substantially isolated from effects resulting from forces which may be applied to frame 510, thereby substantially preserving the alignment of optical components 506 mounted to beams 502 and 504.

Figure 5B:
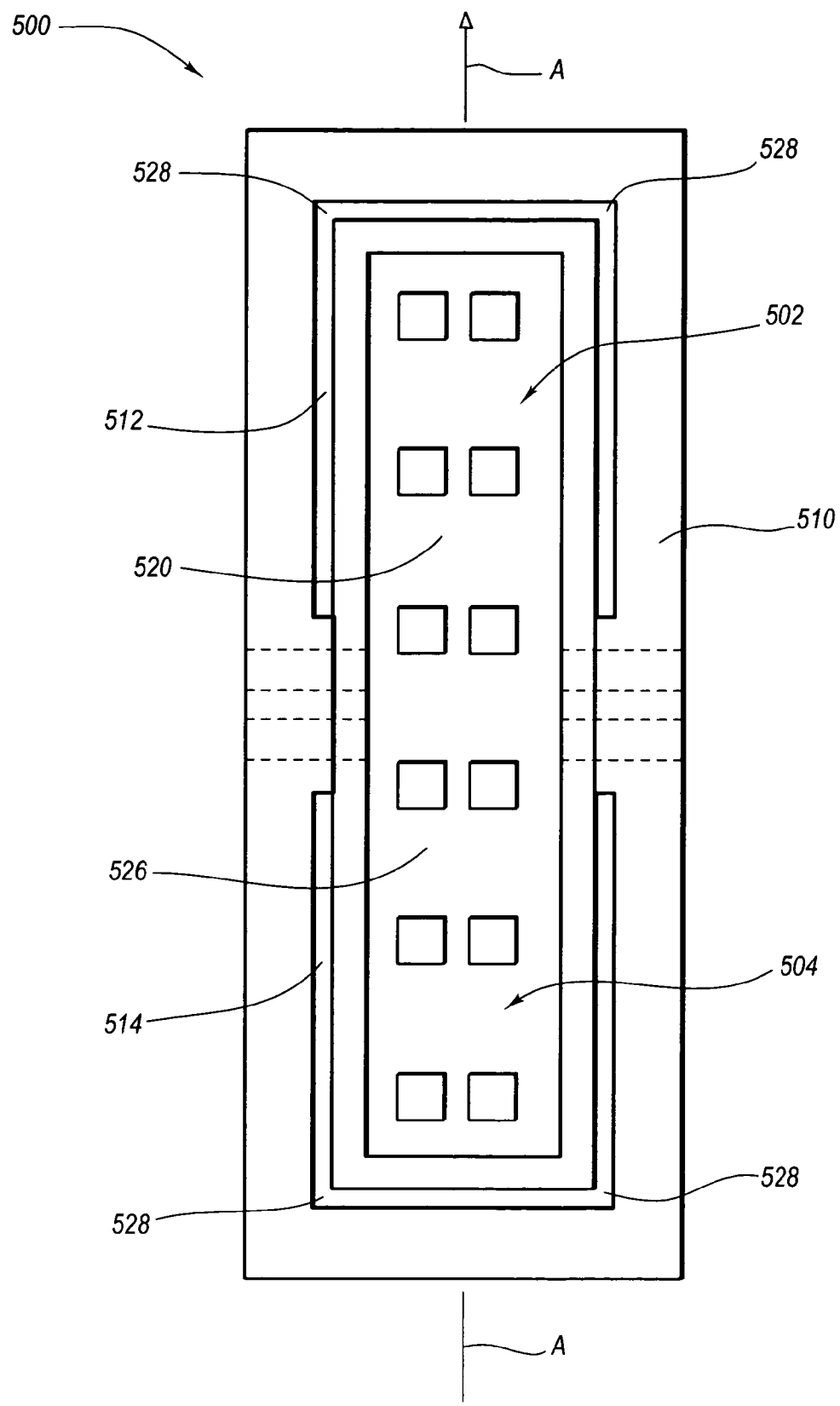
FIG. 5B is a top view of an exemplary package.

With attention now to FIG. 5B, a top view of package 500 with beams 502 and 504, frame 510, and channels 512 and 514 is shown. As noted above, beams 502 and 504 are attached at connection points 525 to frame 510. Thus, frame 510 is able to move substantially independently of beams 502 and 504. For example, if frame 510 is subject to a torque applied about an axis AA of frame 510, the torque will have little effect on beams 502 and 504. Therefore, the torque applied to frame 510 will have little effect on the alignment of optical components 506 mounted to beams 502 and 504.

Further, as mentioned above with regard to FIGS. 4A and 4B, channels 512 and 514 may include damping materials positioned therein to connect beams 502 and 504 to frame 510. For example, adhesives may be placed in the channels 512 and 514 at one or more spots, such as corners 528, and extend from the beams 502 and 504 to the frame 510.

Alternatively, adhesive may be used to fill channels 512 and 514 entirely. Any conventional damping material, such as, for example, silicone elastomer glue, may be used in embodiments of the invention. Use of damping materials in this way can desirably change the response of package 500 to applied forces while still permitting at least some relative motion between the beam and frame. In addition, other variables such as, but not limited to, size, geometry, location, and orientation of the one or more beams, channels and/or other package structures can be modified as required.

Figure 6A:
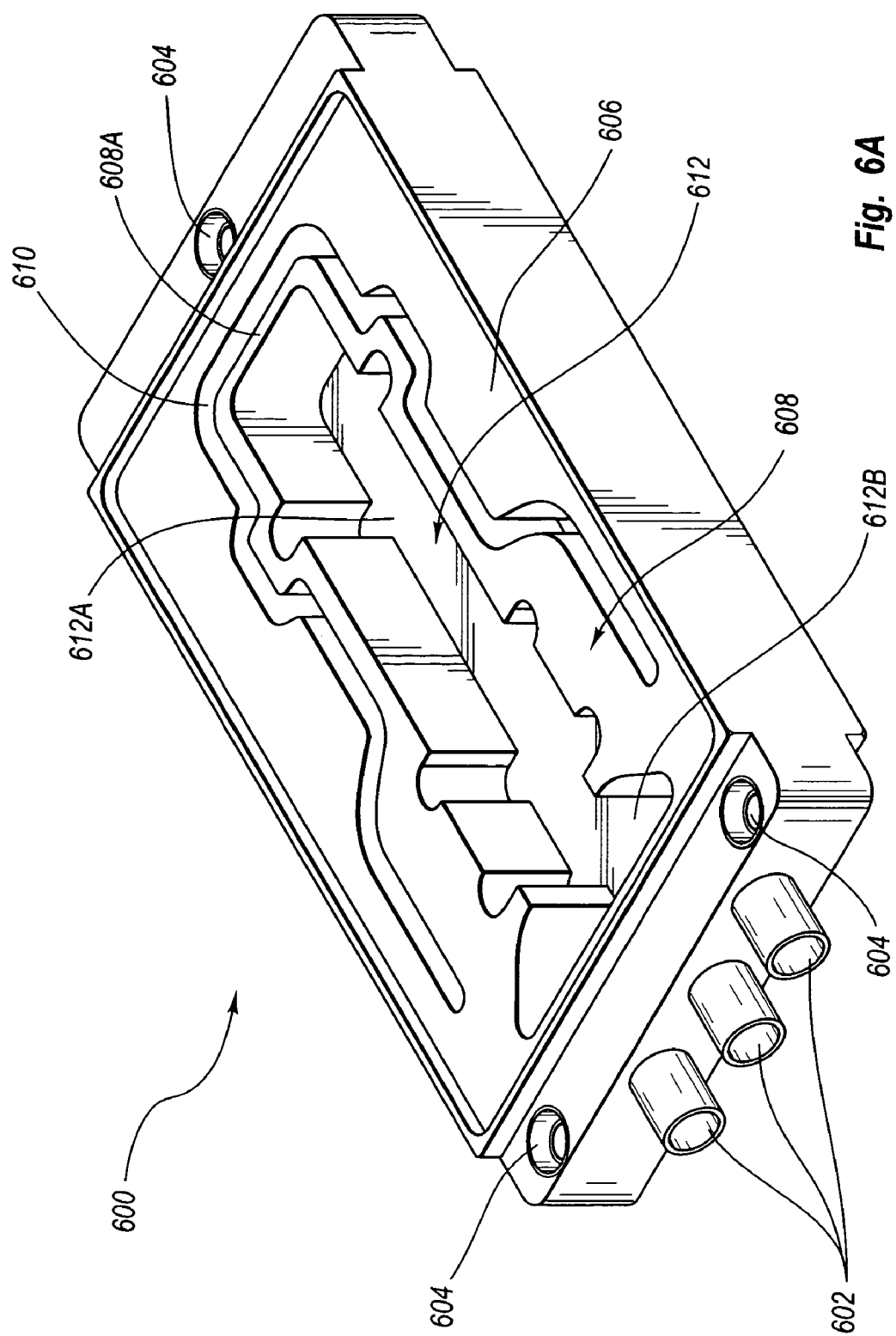
FIG. 6A is a perspective view of an alternative embodiment of a package.
Figure 6B:
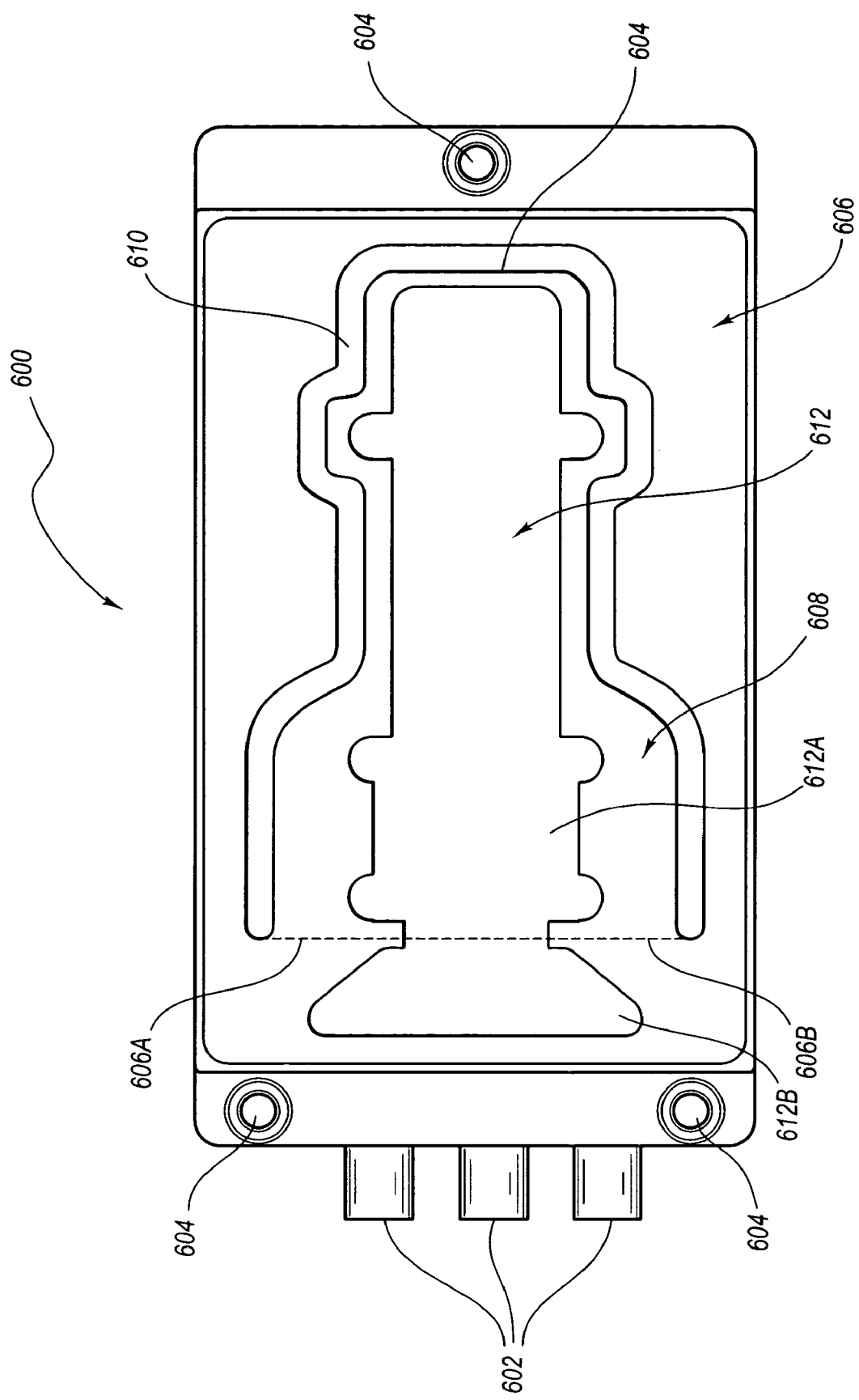
FIG. 6B is a top view of the embodiment indicated in FIG. 6A.

Directing attention now to FIGS. 6A and 6B, details are provided concerning an alternative implementation of a package 600 for housing various components. Similar to other exemplary embodiments herein, the package 600 includes one or more optical ports 602 configured and arranged to facilitate communication between components (not shown) positioned in the package 600, and external systems, devices and components (not shown). The package 600 further includes one or more fastener holes 604, which may be threaded or through holes for example, that cooperate with fasteners (not shown) to permit attachment of top and bottom covers (not shown) to the package 600.

The package 600 is similar to other embodiments disclosed herein insofar as the package 600 includes a frame 606 to which a beam 608 is attached. It should be noted here that, as in the case of the other exemplary embodiments, the term "beam" is employed as a general term and is not intended to imply any particular physical configuration or arrangement, or to otherwise limit the scope of the invention to any particular configuration(s) or arrangement(s).

While the illustrated embodiment is concerned with an exemplary arrangement where the beam 608 and frame 606 are integral with each other, the attachment of the beam 608 to the frame 606 can be considered as occurring along the indicated imaginary line at the locations generally denoted 606A and 606B. Elsewhere, the beam 608 is spaced apart from the frame 606 by a channel 610. As indicated in FIGS. 6A and 6B, the terminal portions of the channel 601 proximate locations 606A and 606B are radiused so as to reduce the likelihood of the occurrence of stress concentrations in those areas. More generally however, aspects of the geometry, orientation and arrangement of the structural elements disclosed herein may be designed and implemented to avoid, or at least reduce, the occurrence and effects of phenomena such as, but not limited to, stress concentrations.

In the illustrated embodiment, the channel 610 has a shape that generally corresponds with the outline of the beam 608, but other channel configurations may be employed as well in this and other embodiments of the invention. For example, it may be desirable in some instances to vary the width of the channel. In one configuration, the channel is widest in areas where excursion, or movement, of the beam is expected to be at a maximum. In this exemplary case, the channel can be made correspondingly narrower in areas where movement of the beam is expected to be relatively minimal, such as near locations 606A and 606B. Of course, other aspect(s) of the size, geometry and arrangement of one or more of the beam 608, frame 606 and/or channel 610 can be selected to suit the requirements of a particular application. This is true as well with respect to the other exemplary embodiments disclosed herein.

As another example, the exemplary package 600 illustrated in FIGS. 6A and 6B, and particularly the frame 606, beam 608 and channel 610, are generally symmetric about an imaginary axis BB defined by the package 600 and located, in this example, in the x-y plane. However, the scope of the invention is not limited to arrangements exhibiting such symmetry. Rather, one or more of the frame 606, beam 608 and channel 610 may be configured to be asymmetric with respect to the axis BB, and/or with respect to some other reference.

With continuing reference now to the exemplary package 600 disclosed in FIGS. 6A and 6B, the beam 608 and frame 606 are configured to cooperatively define a platform 612 upon which various electrical, electronic, optical, optoelectronic, and other, components may be disposed. Particularly, the exemplary platform 612 includes a first platform portion 612A, substantially defined by the beam 608, that is contiguous with a second platform portion 612B, substantially defined by the frame 606. This is an exemplary arrangement only however and, in some alternative embodiments, the entire platform is defined by, or otherwise included in, the beam. As in the case of other embodiments of the invention, components can be positioned at any desired location on the platform, whether that platform is defined by the beam or cooperatively by the frame and beam.

Correspondingly, components may be located within a component mounting portion, one example of which is indicated in FIGS. 6A and 6B, based upon the relative sensitivity of such components to forces exerted upon the package within which the components are disposed. For example, components that are relatively more sensitive to the exertion of such forces are located near the unattached end 608A of beam 608, where the range of unrestricted motion of the beam 608 in the x-y plane for example, is at a relative maximum. As disclosed elsewhere herein, such a range of motion serves to attenuate, if not eliminate, effects that would otherwise result from the application of a force or forces to the package 600.

Conversely, components that are relatively less sensitive to the exertion of forces on the package 600 are located relatively closer to locations 606A and 606B where the beam 608 is attached to the frame 606, since the range of motion of the beam 608 in the x-y plane for example is at a relative minimum in those locations. Because the extent to which the effects resulting from external forces are attenuated in the package 600 varies at different locations along the x-axis, components can be located according to the degree to which those components are sensitive to the exertion of such forces on the package 600. Further, and more generally, one or more structures of the exemplary package 600 can be configured and arranged to provide a desired effect at a particular location within the package 600.

It should be noted that the foregoing considerations are germane as well to the other exemplary embodiments disclosed herein. Further, while such considerations have been addressed herein in terms of an x-y plane, those considerations apply, more generally, to other frames of reference as well.

As the foregoing indicates, the configuration, arrangement and operation of packages such as those disclosed herein can be designed and implemented to provide various desirable effects. In general, various design processes can be employed to facilitate attainment of a variety of results.

By way of example, the shape of the exemplary beam 608 indicated in FIGS. 6A and 6B has been defined using a finite element analysis ("FEA") tool. In this particular example, the beam 608 has been designed so that that the beam 608 and associated components will collectively remain in a substantially non-resonant condition, without the use of damping material in the channel 610 between the beam 608 and frame 606, so long as excitation frequencies associated with forces applied to the package 600 remain within a range of about 0 kHz to about 2 kHz.

As the foregoing makes clear, the use of FEA, or other tools and techniques of comparable functionality, enables the design and implementation of package 600 structures that can be optimized for a particular set of physical constraints, performance parameters, and operating conditions. Moreover, results obtained with FEA or other analytical techniques can be verified to ensure that there is acceptable correspondence between the designed solution and the physical implementation.

Figure 7A:
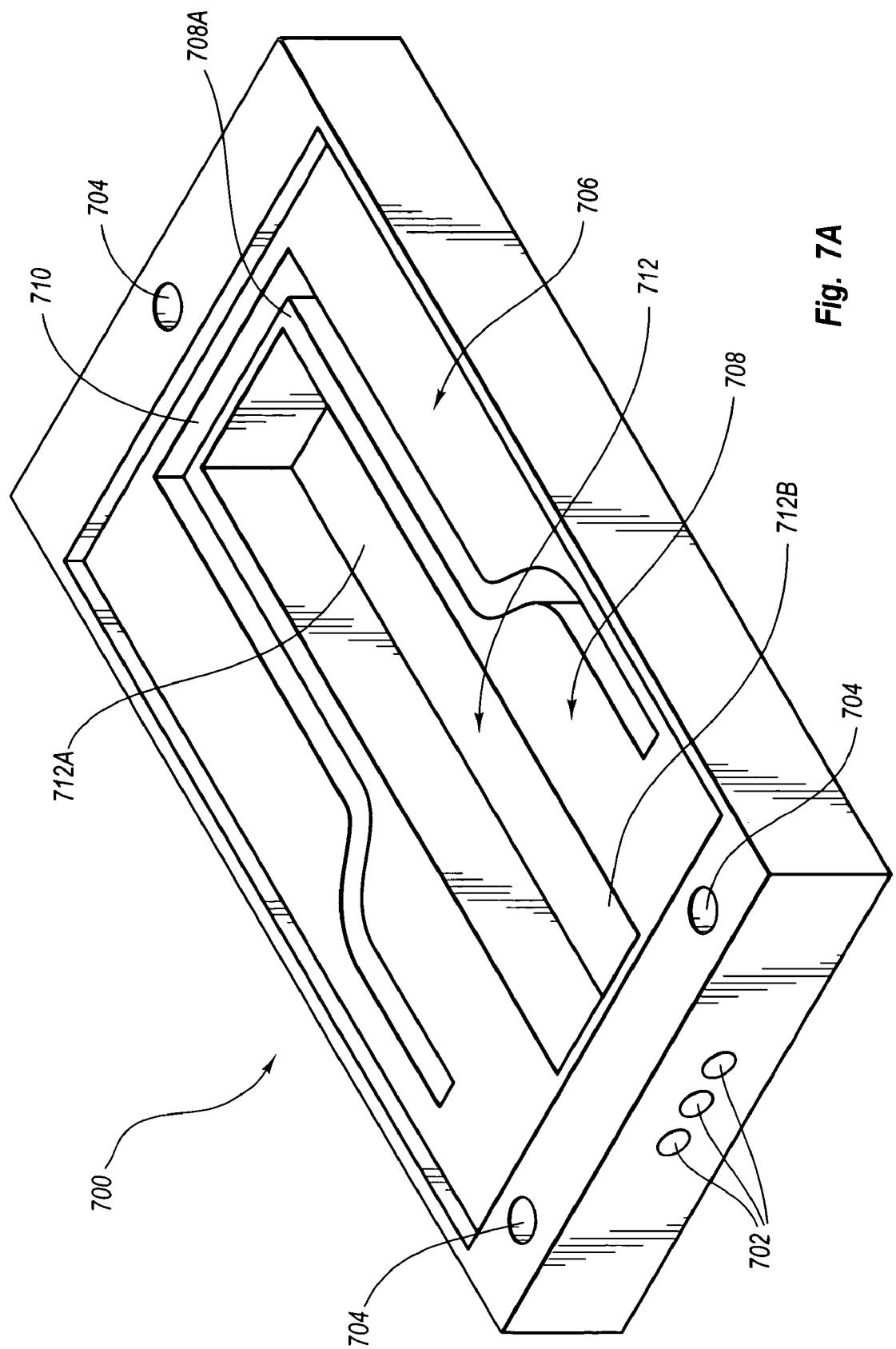
FIG. 7A is a perspective view of another exemplary package.
Figure 7B:
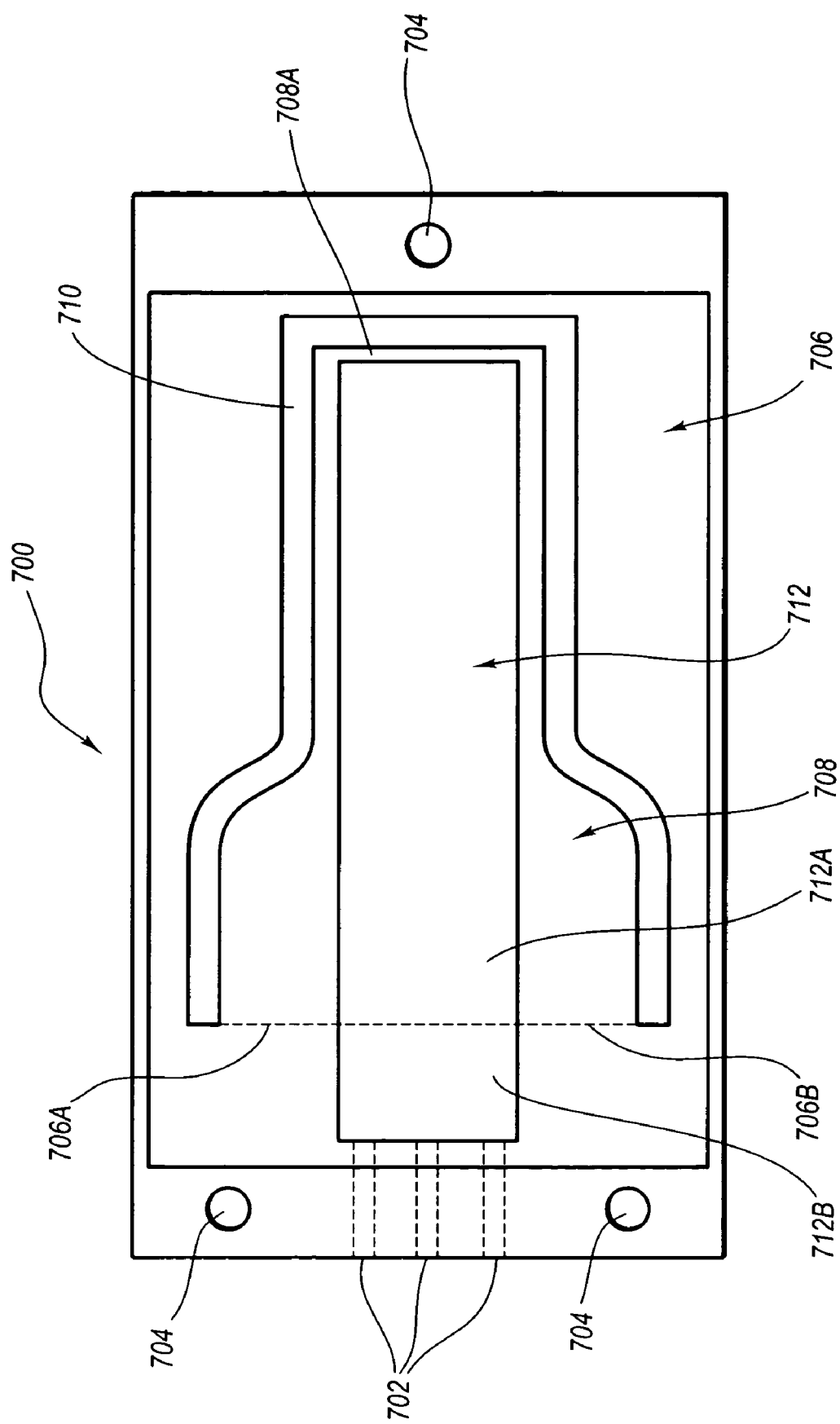
FIG. 7B is a top view of the embodiment indicated in FIG. 7A.

Directing attention finally to FIGS. 7A and 7B, details are provided concerning an exemplary package 700. Similar to other exemplary embodiments herein, the package 700 includes one or more optical ports 702 configured and arranged to facilitate communication between components (not shown) positioned in the package 700, and external systems, devices and components (not shown). The package 700 also includes one or more fastener holes 704 that cooperate with fasteners (not shown) to permit attachment of top and bottom covers (not shown) to the package 700.

As in the case of other embodiments disclosed herein, the package 700 includes a frame 706 to which a beam 708 is attached. While the illustrated embodiment is concerned with an exemplary arrangement where the beam 708 and frame 706 are integral with each other, the attachment of the beam 708 to the frame 706 can be considered as occurring along the indicated imaginary line at the locations generally denoted 706A and 706B. Elsewhere, the beam 708 is spaced apart from the frame 706 by a channel 710.

In general, the beam 708 is relatively wider at its attached end than at its unattached end 708A, but the scope of the invention is not limited to such configurations. In the illustrated embodiment, the channel 710 has a shape that generally corresponds with the outline of the beam 708, but other channel configurations may be employed as well in this and other embodiments of the invention.

With continuing reference now to the exemplary package 700 disclosed in FIGS. 7A and 7B, the beam 708 and frame 706 are configured to cooperatively define a platform 712 upon which various electrical, electronic, optical, optoelectronic, and other, components may be disposed. Particularly, the exemplary platform 712 includes a first platform portion 712A, substantially defined by the beam 708, that is contiguous with a second platform portion 712B, substantially defined by the frame 706. This is an exemplary arrangement only however and, in some alternative embodiments, the entire platform is defined by, or otherwise included in, the beam. As in the case of other embodiments of the invention, components can be positioned at any desired location on the platform, whether that platform is defined by the beam or cooperatively by the frame and beam.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A package suitable for housing optical and electrical components, the package comprising:
    a frame;
    top and bottom lids that cooperate with the frame to substantially define an enclosure;
    a beam disposed within the enclosure and attached to the frame in a cantilever arrangement; and
    at least one component disposed on the beam, wherein the package defines an open space interposed between the frame and a substantial portion of the beam and a damping material is placed in the open space thereby attaching the frame to the beam.

2. The package as recited in claim 1, wherein the beam is configured such that neither the beam nor the at least one component disposed thereon come into contact with the top and bottom lids.

3. The package as recited in claim 1, wherein the beam is configured and arranged so that the beam and the at least one component are collectively in a substantially non-resonant condition over a predetermined range of package excitation frequencies.

4. The package as recited in claim 1, wherein the damping material is an adhesive.

5. The package as recited in claim 1, wherein the frame and the beam are comprised of the same material.

6. The package as recited in claim 5, wherein the material is one of metal; plastic; glass; or, ceramic.

7. The package as recited in claim 1, wherein the at least one component is configured to connect to a device located outside of the package through optical ports passing through the frame to the beam.

8. A package suitable for housing optical and electrical components, the package comprising:
    a frame;
    top and bottom lids that cooperate with the frame to substantially define an enclosure;
    a plurality of beams disposed within the enclosure and attached to the frame in a cantilever arrangement; and
    at least one optical component disposed on each of the plurality of beams, wherein the package defines an open space interposed between the frame and the plurality of beams and a damping material is placed in the open space thereby attaching the frame to the plurality of beams.

9. The package as recited in claim 8, wherein the plurality of beams are configured such that neither the plurality of beams nor the at least one component disposed thereon come into contact with the top and bottom lids.

10. The package as recited in claim 8, further comprising:
    a damping material, wherein the damping material attaches the plurality of beams to the frame.

11. The package as recited in claim 8, wherein the damping material is an adhesive.

12. The package as recited in claim 8, wherein the frame and the plurality of beams are comprised of the same material.

13. The package as recited in claim 12, wherein the material is one of: metal; plastic; glass; or, ceramic.

14. The package as recited in claim 8, wherein the at least one component is configured to connect to a device located outside of the package through optical ports passing through the frame to the beam.

* * * * *